US010713034B2

(12) United States Patent
Aleksandrov et al.

(10) Patent No.: US 10,713,034 B2
(45) Date of Patent: *Jul. 14, 2020

(54) UPDATING WEB RESOURCES

(71) Applicant: Workday, Inc., Pleasanton, CA (US)

(72) Inventors: Anton Aleksandrov, Shfaim (IL); Amit Ben-Sheffer, Kfar Saba (IL); Raanan Avidor, Herzliya (IL); Yoav Bodor, Tel Aviv (IL); Ishai Borovoy, Shfayim (IL); Yaron Goldberg, Raanana (IL); Todd Eric Kaplinger, Raleigh, NC (US); Iddo Levin, Tel Aviv (IL); Ran Enriko Magen, Tel Aviv (IL); Ron Perry, Bnei Zion (IL); Artem Spector, Rishon Le-Zion (IL)

(73) Assignee: Workday, Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/128,308

(22) Filed: Sep. 11, 2018

(65) Prior Publication Data

US 2019/0013993 A1 Jan. 10, 2019

Related U.S. Application Data

(63) Continuation of application No. 15/367,345, filed on Dec. 2, 2016, now Pat. No. 10,282,191, which is a (Continued)

(51) Int. Cl.
*G06F 8/65* (2018.01)
*H04L 29/08* (2006.01)
*H04L 29/06* (2006.01)

(52) U.S. Cl.
CPC ............ *G06F 8/65* (2013.01); *H04L 29/0809* (2013.01); *H04L 67/02* (2013.01); *H04L 67/06* (2013.01);
(Continued)

(58) Field of Classification Search
CPC . G06F 8/65; H04L 67/34; H04L 67/10; H04L 67/06; H04L 67/02; H04L 29/0809; H04L 67/42
See application file for complete search history.

(56) References Cited

U.S. PATENT DOCUMENTS 6,167,567 A * 12/2000 Chiles ..................... G06F 9/454
717/173
6,769,019 B2 7/2004 Ferguson
(Continued)

*Primary Examiner* — Jimmy H Tran
(74) *Attorney, Agent, or Firm* — Van Pelt, Yi & James LLP

(57) ABSTRACT

Updating web resources includes extracting web resources from the application to local files, and querying an external server for web resource updates specific to at least one operating condition of the client device. A client device includes at least one processor to execute computer readable instructions to extract a web resource from an application downloaded to a native container of a client device, and query a server for web resource updates with a query that comprises a native container identification. A server includes at least one processor to execute computer readable instructions to generate an update bundle for web resources downloaded in an application package by a client device, the update bundle comprising at least one update that is specific to an operating condition of the client device, and, in response to a request from the client device, send the update bundle to the client device.

19 Claims, 8 Drawing Sheets

Related U.S. Application Data continuation of application No. 13/474,371, filed on May 17, 2012, now Pat. No. 9,525,587.

(52) U.S. Cl.
CPC .............. *H04L 67/10* (2013.01); *H04L 67/34* (2013.01); *H04L 67/42* (2013.01)

(56) References Cited

U.S. PATENT DOCUMENTS

| | | | |
|---|---|---|---|
| 6,996,818 B2 | 2/2006 | Jacobi et al. | |
| 7,293,115 B2 | 11/2007 | DaCosta et al. | |
| 7,313,657 B1 | 12/2007 | Katzer et al. | |
| 7,702,814 B2 | 4/2010 | Lee et al. | |
| 7,711,775 B2 | 5/2010 | Tavis et al. | |
| 7,761,591 B2 | 7/2010 | Graham | |
| 7,761,849 B2 | 7/2010 | van Woerkom et al. | |
| 7,805,730 B2 | 9/2010 | Holmes et al. | |
| 7,818,742 B2 | 10/2010 | Laird et al. | |
| 7,831,605 B2 | 11/2010 | Plastina et al. | |
| 7,882,228 B2 | 2/2011 | Montes De Oca et al. | |
| 7,933,970 B2 | 4/2011 | Zimler et al. | |
| 7,958,496 B2 | 6/2011 | Bjare et al. | |
| 7,975,264 B2 | 7/2011 | Sriram, I et al. | |
| 8,015,491 B2 | 9/2011 | Shaver et al. | |
| 8,065,672 B2 | 11/2011 | Sriram | |
| 8,156,224 B2 | 4/2012 | De Oca | |
| 8,448,187 B2 | 5/2013 | Inami | |
| 8,683,443 B2 | 3/2014 | Hatton | |
| 9,003,387 B2 | 4/2015 | Van Camp | |
| 9,143,530 B2 * | 9/2015 | Qureshi | H04W 12/06 |
| 9,203,912 B2 | 12/2015 | Krishnaswamy | |
| 9,391,789 B2 | 7/2016 | Krishnaswamy | |
| 9,392,074 B2 | 7/2016 | Aggarwal | |
| 9,398,113 B2 | 7/2016 | Aggarwal | |
| 2002/0078262 A1 | 6/2002 | Harrison et al. | |
| 2002/0120725 A1 | 8/2002 | Dacosta | |
| 2004/0092255 A1 | 5/2004 | Ji et al. | |
| 2004/0128347 A1 * | 7/2004 | Mason | H04L 29/06 709/203 |
| 2005/0108626 A1 | 5/2005 | Ong | |
| 2005/0132331 A1 | 6/2005 | Wood | |
| 2006/0248069 A1 * | 11/2006 | Qing | G06F 8/60 |
| 2007/0050762 A1 | 3/2007 | Chen et al. | |
| 2007/0067373 A1 * | 3/2007 | Higgins | G06F 11/3013 |
| 2007/0078907 A1 | 4/2007 | Chiang | |
| 2007/0143768 A1 | 6/2007 | Inami | |
| 2007/0180075 A1 * | 8/2007 | Chasman | G06F 16/27 709/223 |
| 2007/0209005 A1 | 9/2007 | Shaver | |
| 2007/0260637 A1 | 11/2007 | Shenfield et al. | |
| 2007/0260673 A1 | 11/2007 | Shenfield et al. | |
| 2007/0260674 A1 | 11/2007 | Shenfield | |
| 2007/0260718 A1 | 11/2007 | Shenfield | |
| 2007/0260744 A1 | 11/2007 | Shenfield | |
| 2007/0269074 A1 | 11/2007 | Broadley et al. | |
| 2008/0046449 A1 | 2/2008 | Lee et al. | |
| 2008/0077941 A1 * | 3/2008 | Holmes | G06F 3/0486 719/326 |
| 2009/0119375 A1 | 5/2009 | Shenfield | |
| 2010/0095158 A1 | 4/2010 | Shah-Hosseini | |
| 2010/0106790 A1 | 4/2010 | Shenfield | |
| 2010/0162124 A1 | 6/2010 | Morris | |
| 2010/0251206 A1 * | 9/2010 | Horiuchi | G06F 16/1767 717/103 |
| 2011/0082763 A1 | 4/2011 | Leite et al. | |
| 2011/0185287 A1 | 7/2011 | Dharmarajan et al. | |
| 2011/0214112 A1 | 9/2011 | Vidal | |
| 2011/0252356 A1 | 10/2011 | Morris | |
| 2011/0307318 A1 | 12/2011 | Laporte | |
| 2012/0042004 A1 | 2/2012 | Shenfield | |
| 2012/0179633 A1 | 7/2012 | Ghani | |
| 2012/0317492 A1 | 12/2012 | Sheeder | |
| 2013/0055233 A1 | 2/2013 | Hatton | |
| 2013/0227522 A1 | 8/2013 | Lerum | |
| 2013/0311985 A1 | 11/2013 | Aleksandrov | |
| 2014/0006347 A1 * | 1/2014 | Qureshi | H04L 63/0471 707/621 |
| 2016/0191645 A1 | 6/2016 | Hayton | |
| 2017/0220334 A1 | 8/2017 | Hart | |

* cited by examiner

UPDATING WEB RESOURCES

The present application is a continuation of and claims priority under 35 U.S.C. § 120 to U.S. application Ser. No. 15/367,345, filed Dec. 2, 2016 which is a continuation of U.S. application Ser. No. 13/474,371, filed May 17, 2012, each entitled, "UPDATING WEB RESOURCES," both of which are incorporated herein by reference in their entirety.

BACKGROUND

The present invention relates to updating web resources, and more specifically, updating web resources on devices that download and operate applications.

Applications for mobile devices, such as electronic tablets and cell phones, may be downloaded over the internet. These applications allow users to do a variety of activities such as read literature, create illustrations, annotate documents, play games, and other activities. Often, a user virtually visits an online application store where such applications may be downloaded for free or purchased for a price.

BRIEF SUMMARY

A method for updating web resources includes downloading an application to a client device, extracting web resources from the application to local files, and querying an external server for web resource updates specific to at least one operating condition of the client device.

A method for updating web resources includes receiving a query from a client device for updates to web resources that were pre-packed into an application downloaded to the client device and responding to the query with specific updates that are specific to at least one operating condition of the client device.

A method for updating web resources includes downloading an application into a native container of a client device, extracting web resources from the application to local files in response to an initial start-up of the application, and querying an external server for web resource updates with a query that contains a native container identification in response to a query triggering event.

A method for updating web resources includes generating an update bundle for an application downloaded on a client device, the update bundle comprising at least one update that is specific to an operating condition of the client device; and sending the update bundle to a server that is capable of receiving update queries from the client device.

DETAILED DESCRIPTION

Figure 1:
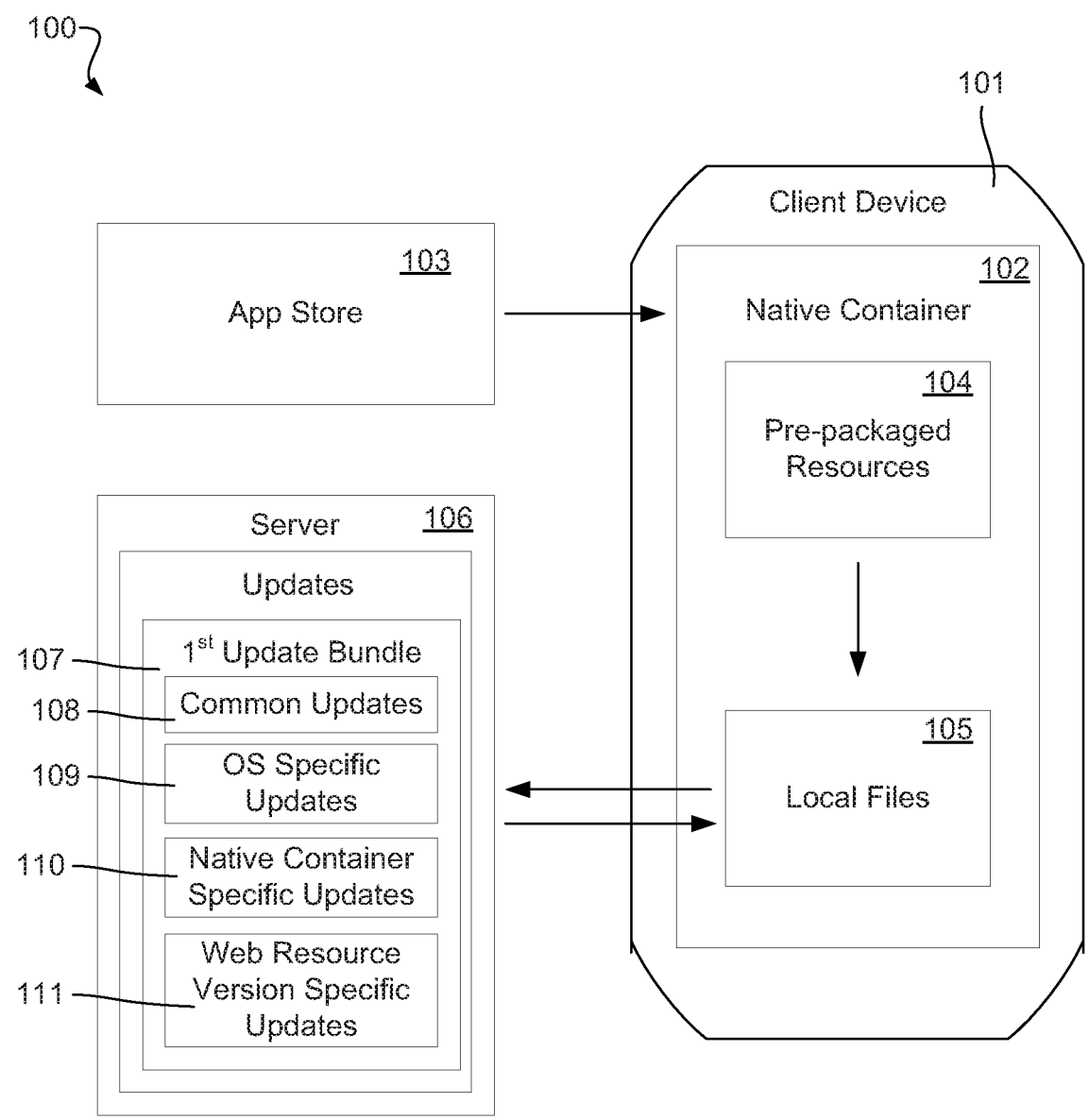
FIG. 1 is a diagram showing an illustrative system for updating web resources, according to one example of the principles described herein.

The present specification describes a method and system for updating web resources such that an application on a client device may receive web resource updates that are specific to operating conditions of the client device.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring now to the figures, FIG. 1 is a diagram showing an illustrative system (100) for updating web resources. In this example, a client device (101) has a native container (102) that is used to operate an application that is downloaded from an online application store (103). Each downloaded application may have its own native container (102) dedicated to that application. The native container (102) may contain machine readable code that provides an interface with which a user may interact with an application through the client device (101).

For example, the native container (102) may use web resource to run various features of the application and provide other services that allow the user to interact with the application. Native containers may be updated from time to time to improve the native containers' features and to provide additional capability to interact with the application. For example, newer versions of a particular application may include particular features, such as voice recognition. However, older versions of the native container may not have the capability to run that particular feature.

In some examples, the client device is a mobile device, such as an electronic tablet, a phone, a hand held electronic device, a watch, other mobile device, or combinations thereof. A user may search the application store (103) with the client device (101) over an internet connection. In examples where a user requests to download an application from the store (103), the application store may send the application over the connection to the client device (101).

The application may contain machine readable instructions to extract pre-packaged web resources (104) from the application during the application's initial start-up and store the web resources in local files (105). The web resources may be markup language resources, client side scripting implementations, files, media resources, other resources, or combinations thereof. A list of non-exhaustive examples of markup language resources may include hypertext markup language (HTML) pages, cascading style sheets (CSS), other markup language resources, or combinations thereof. An example of client side scripting implementations may include JavaScript.

In some examples, the local files are created for the dedicated purpose of storing web resources. In some examples, the local files are permanent files that are saved to the client device. For example, the local files may be created with non-volatile memory, volatile memory, memory caches, random access memory, read only memory, electrically erasable programmable read only memory, flash memory, static memory, dynamic memory, other file locations, or combinations thereof.

When an application is operating, the application creates a private browser that implements web resources to operate the application. The web resources may be located in the local files and the private browser may access the web resource through the local files.

During the initial operation of the application, the application may use just the web resources that were originally pre-packaged within the application. In some examples, however, the application queries an external server (106) for updates to the web resources during the application's initial use. In alternative examples, the application just queries the external server (106) on subsequent application start-ups. If updates are available, the external server (106) may send the updates to the client device (101), which may store the updates in the local files (105).

In response to downloading the updates, the application may begin to use the updated version of the web resources. In some examples, the application continues to use the older version of the web resources while the updated version is downloading. In some examples, the application waits to operate until the updated version is finished downloading. In other examples, the application continues to use the older version of the web resources until the next subsequent start-up. In some examples, the updated version replaces the older version of web resources. In other examples, the web resource updates merely replace portions of the web resources. In some examples, the web resource updates are extracted to the local files after the download is complete. In such an example, if the download fails before completion, the web resource updates that were successfully downloaded may be extracted after the download fails or the web resource updates may be disregarded so that the complete download may be completed at a later time.

If no updates are available, the application may use the version of the web resources currently in the local files (105). The updates may be unavailable if there are no updates stored in the external server (106) or there is no connection between the client device (101) and the external server (106).

By pre-packaging the web resources in the application, the client device (101) is free to operate the application without relying on internet connectivity to access the web resources. Further, by downloading the web resources to local files, the application start-up time is minimized because the client device does not need to connect with an online source for access to the web resources. By downloading web resource updates as they become available, the application may receive the latest updates without having to re-download the entire application every time a web resource changes.

The external server (106) may include update bundles for updates targeted to client devices with different operating conditions. For example, some updates may be specific to a particular type of operating system or a particular version of a native container and may be unsuited for applications running on client devices operating with different types operating systems or different versions of the native container. Thus, multiple versions of an update may be made, with each version tailored for specific operating conditions of the client device. On the other hand, some updates may be common updates that are targeted to multiple operating conditions.

In the example of FIG. 1, the external server (106) has a first update bundle (107) targeted to client devices with a specific type operating system, a specific native container version, and specific web resource version. The first update bundle (107) may include common updates (108) which may be compatible with multiple operating conditions of client devices. Further, the first update bundle (107) may include at least one first operating system specific update (109), at least one native container specific update (110), and a web resource version update (111).

In other examples, the external server (106) has different update bundles that may include different operating system specific updates, different native container version updates, different web resource version updates, other operating condition versions, or combinations thereof.

In the example of FIG. 1, the external server (106) is a different internet location than where the application was original downloaded. In other examples, the external server provides both entire application for downloading and updates as they become available. In response to a query, the server may determine which update bundle is appropriate for the client device and send that update bundle.

Figure 2:
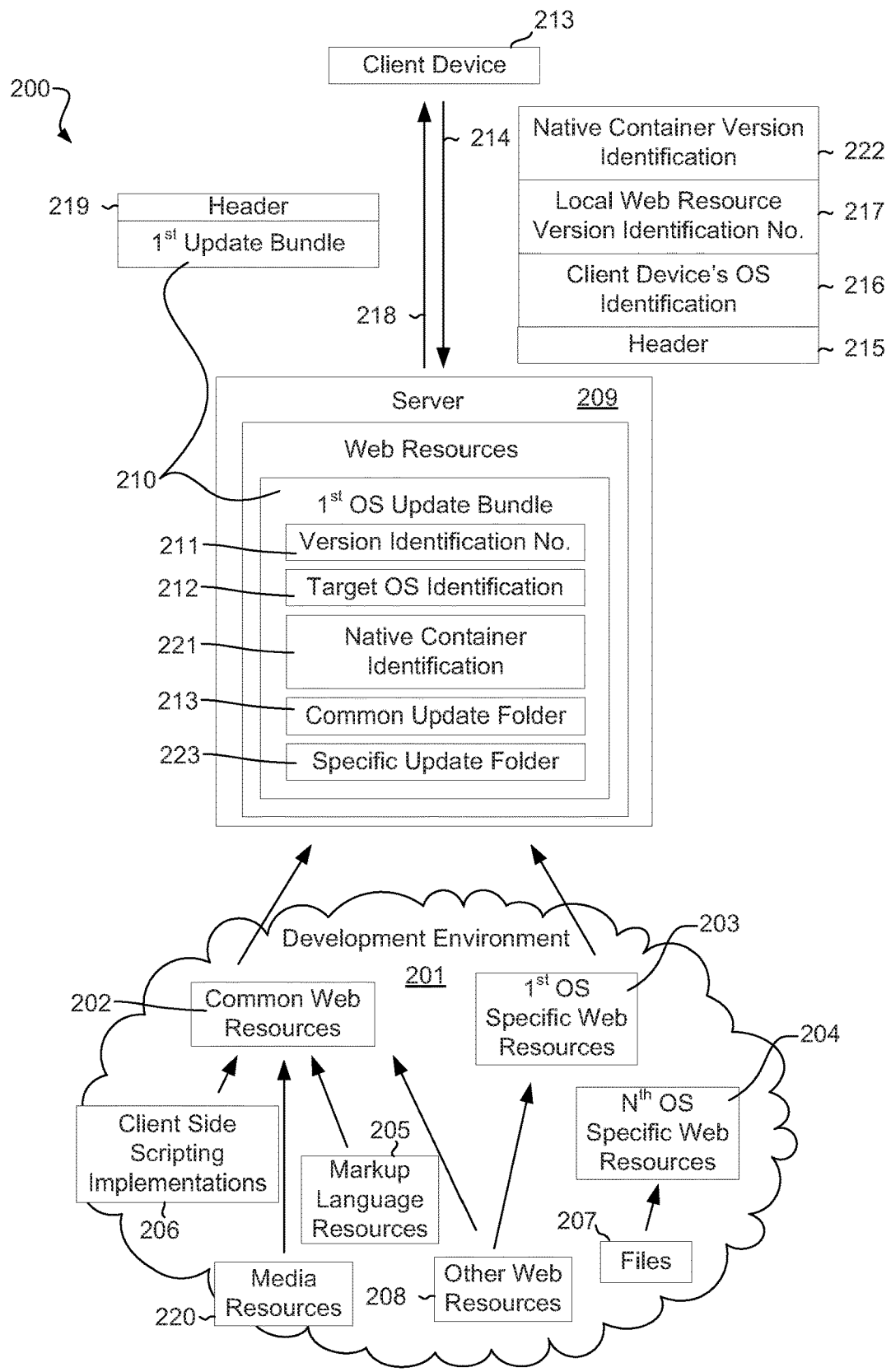
FIG. 2 is a diagram showing an illustrative system for updating web resources, according to one example of the principles described herein.

FIG. 2 is a diagram showing an illustrative system (200) for updating web resources. In this example, web resources are being assembled in a development environment (201) to create common web resources (202) that are targeted to multiple kinds of operating systems and specific web resources that are specific to particular kinds of operating systems. For example, the updates may use a single code that is specific for an operating system. In this example, the specific web resources include at least one first operating system specific web resource (203) and at least one $N^{th}$ operating system specific web resource (204), where "$N^{th}$" is the last operating system specific web resource update. In this example, the web resources include markup language resources (205), client side scripting implementations (206), files (207), media resources (220), and other resources (208). While not shown in the example of FIG. 2, the updates for the native container or other operating conditions may also be assembled or developed in the development environment (201).

After the web resources are built they may be assembled into update bundles and sent to an external server (209) that may be queried by client devices. In this example, the external server (209) has a first operating system update bundle (210) that includes a version identification number (211), a target operating system identification (212), common updates folder (213) with updates common to multiple operating systems, and a specific update folder (223) with updates specific to particular operating conditions. The version identification number (211) may be used to identify which version of updates is included in the bundle. The target operating system identification (212) may be used to identify the operating system for which the bundle is targeted.

In some examples, the update bundles are also marked with a native container identification (221), so the requesting client device may know for which version of the native container that the updates are intended. For example, an update may include web resources to run a specific feature, such as a voice recognition feature, that is supported in just the most recent version of the native container. If the client device does not have that version of the native container, the updates may not be compatible.

A client device (213) may query the external server (209) for updates to the application. The query (214) may include a header (215) that contains the server's address, the client device's operating service identification (216), a local web resource version identification number (217), and a native container version identification (222). If the first update bundle is appropriate for the client device (213), a response (218) may be sent to the client device (213) that includes a header (219), which contains the client device's address, and the first bundle (210).

In some examples, the client device (213) knows its operating conditions. A non-exhaustive list of operating conditions may include web resource versions, native container versions, operating systems types, other conditions, and combinations thereof. In some examples, the web resource version may include a sequential version and a device optimization version. The sequential version may include versions where the latest version is the most up-to-date version of the web resources. The device optimization version may account for web resources that are intended for similar devices that use the slightly different versions of the same type of operating system. For example, applications may include different version of code that are each optimized for different types of devices. These different codes may all be pre-packed into the application prior to downloading them from the online store and the appropriate code version is selected after downloading. When the client device (213) sends a query to the external server (209), the client device (213) may communicate to the server (209) any number of operating conditions to ensure consistency between the update bundles and the client device.

In some examples, the external server (209) recognizes that under the current operating conditions of the client device (213) that no compatible updates are available. However, in some examples, the external server (209) recognizes that the client device (213) is operating with an outdated version of a particular operating condition, such as an outdated native container. In such examples, the external server (209) may send a recommendation to the client device (213) to update a particular operating condition. In response, the client device (213) may request updates for the outdated operating condition and query the external server (209) for web resource updates after updating the outdated operating condition. By sending updates to the client device (213) that are tailored to the operating conditions of the client device (213), both the server (209) and the client device (213) consume less processing energy, reduce bandwidth, and increase processing speed. In response to downloading updates for any of the operating conditions, the client device (213) may update its identifications.

Figure 3:
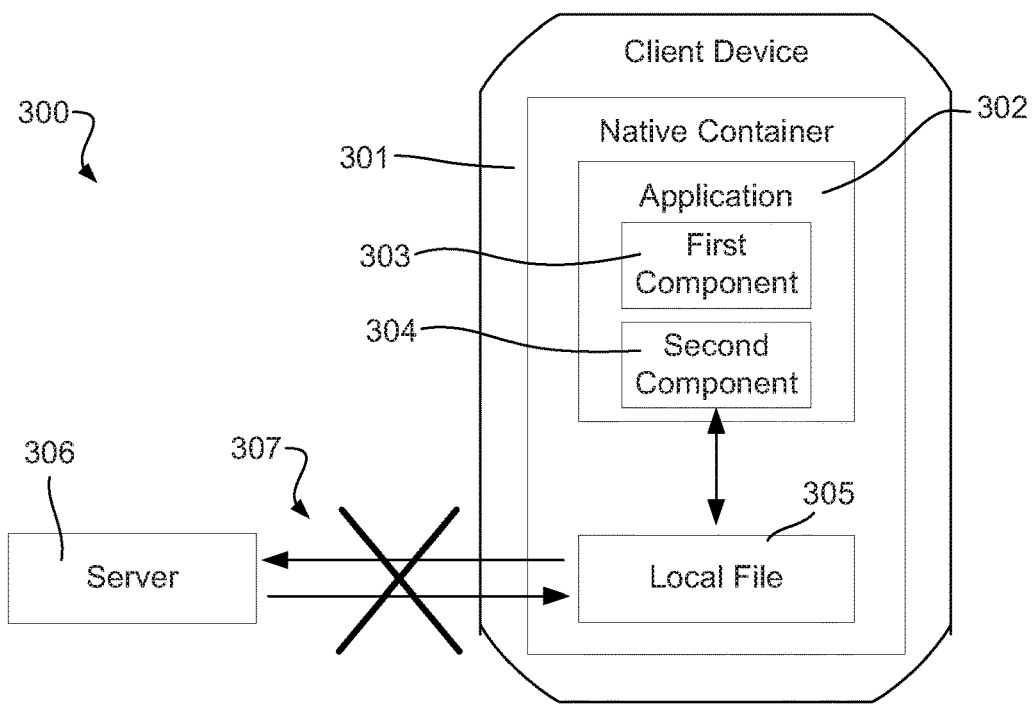
FIG. 3 is a diagram showing an illustrative system for operating an application, according to one example of the principles described herein.

FIG. 3 is a diagram showing an illustrative system (300) for operating an application. In this example, the client device (301) has a downloaded application (302) that has a first component (303) for extracting web resources in response to an initial application start-up and a second component (304) for operating the application. The second application (304) may access the web resources extracted by the first component (303) from the local files (305) during the application's operation and during the application's start-up.

The application (302) may include machine readable instructions to query the external server (306) for updates to the web resources. In the example of FIG. 3, the query is sent during a non-connectivity period between the server (306) and the client device (301). In FIG. 3, the non-connectivity period is depicted with a cross (307). The non-connectivity period may include time periods where the external server (306) is turned off or out of range. In some examples, the non-connectivity period includes times when the server (306) is capable of receiving the query from the client device (301), but the server (306) fails to send the all or part of the web resource updates.

In some examples, the web resources updates are extracted to the local files after the download is complete. In such an example, if the download fails before completion, the web resources updates that were successfully downloaded may be extracted after the download fails or the web resources updates may be disregarded so that the complete download may be completed at a later time.

Figure 4:
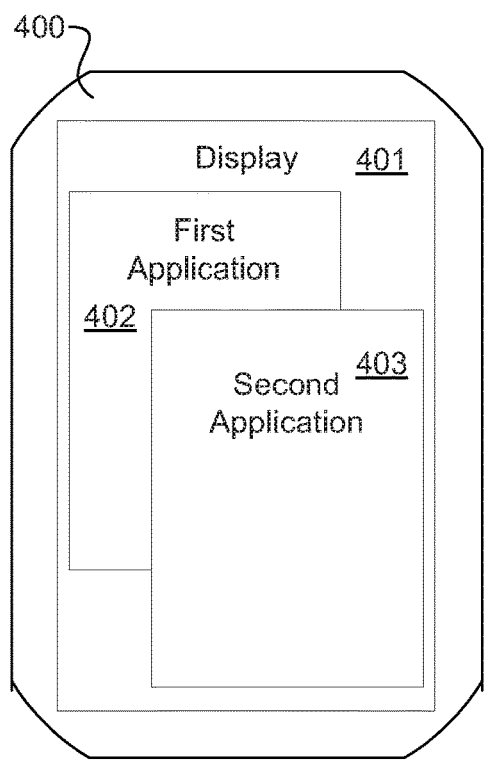
FIG. 4 is a diagram showing an illustrative client device, according to one example of the principles described herein.

FIG. 4 is a diagram showing an illustrative client device (400). Client devices may run several applications at the same time. In this example, the client device has a display (401) where first application (402) and a second application (403) are shown running. The first application (402) is shown running in the background while the second application (403) is shown running in the foreground. An application may be considered to be in the foreground when a user is interacting with that application, and an application may be considered to be in the background when that application is running, but the user is interacting with another application. In this example, the first application (402) is viewable to the user because the second application (403), which is in the foreground, does not occupy the entire display and first application (402) is positioned in a portion of the screen that is not occupied by the second application (403). However, in some examples, an application running in the background is not viewable to the user regardless of whether that application is positioned in a portion of the screen that is not occupied by the foreground application.

In some examples, an application is used for a long time and its foreground/background status may change during that time duration. In some examples, the client device sends a query to the external server in response to a change in an application's foreground/background status. For example, the query for a particular application may be sent in response to the application moving into the background. In other examples, the query for a particular application is sent in response to the application moving into the foreground. In some examples, a query is sent for all of the applications that are running on a client device in response to any foreground/background status changes for any of the running applications.

One advantage to querying for updates at a change in the foreground/background status is that some applications may run for a long time, and as a consequence, rarely experience start-ups. For example, the client device may be a phone that is constantly on to receive calls and an application may run in the background while the phone is on. In such an example, the background application may rarely be turned off, and rarely experience a start-up. In this example, the client device may send a query to the external server to check for updates in response to other query triggering events, such as the user bringing that application to the foreground.

In other examples, the client device sends queries for the background application in response to a new application starting-up. In examples where multiple query triggering events frequently occur, like frequent start-ups or frequent foreground/background status changes, the client device may limit the queries that it sends. For example, some applications may send queries for a particular application just once within a particular time period. The time period may be just a couple of minutes, a hour, multiple hours, a day, a multiples of days, or longer. In some examples, a client device may send queries in response to multiple types of query triggering events.

Figure 5:
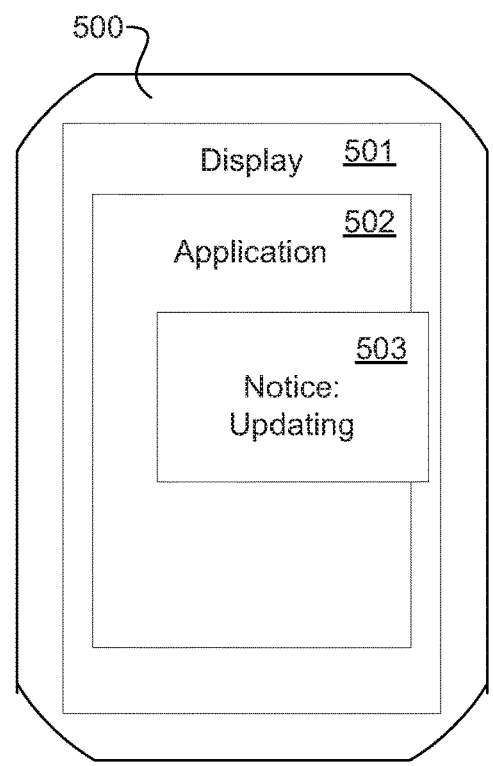
FIG. 5 is a diagram showing an illustrative client device, according to one example of the principles described herein.

FIG. 5 is a diagram showing an illustrative client device (500). The client device (500) has a display (501) with an application (502) running. Also, the display shows a notice (503) that the client device is in a process for updating the web resources. For example, the client device (500) may display the notice when sending a query, determining whether updates at the external server are compatible with the client device's operating conditions, receiving a response from the external server, downloading updates, extracting web resources from the response, or combinations thereof.

The client device (500) may be querying the external server in response to an application start-up, a change in the application's foreground/background status, an application shut-down, another query triggering event, or combinations thereof. In this example, the notice (503) is sent to the user by displaying the notice in written words. In some examples, the notice is sent through different notice mechanisms. For example, the notice may be sent as an audible notice, a vibration, an email, an icon in the display, a light illumination, other mechanism, or combinations thereof.

In some examples, the notice (503) indicates which application or applications are being updated. In other examples, the notice (503) is a generic notice that does not identify which application or applications are being updated. In some examples, a single notice is sent for each application that is being updated. In some examples, the notice (503) has an option where the user can click to close the notice. In some examples, the notice (503) freezes the application to allow the application (502) to complete the process of updating before continuing with the application (502). In some examples, the application (502) continues to run while the notice (503) is active. In some examples, the client device (500) provides the user an option to turn off the notices (503).

Figure 6:
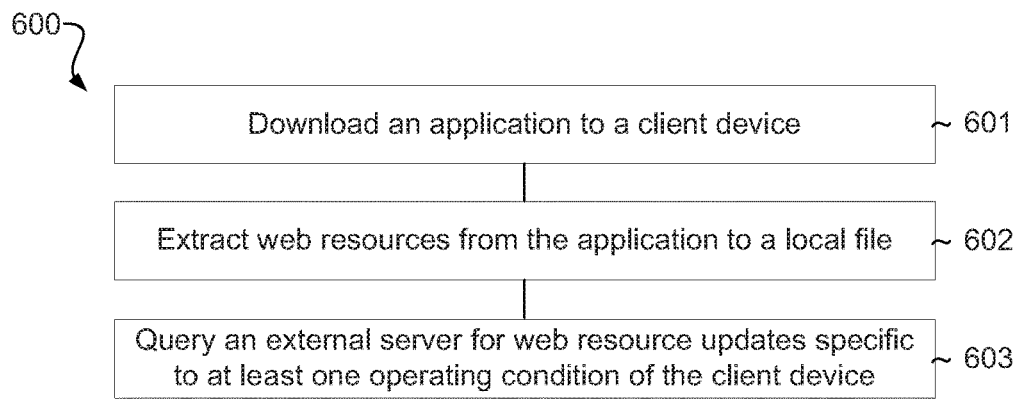
FIG. 6 is a diagram showing an illustrative method for updating web resources, according to one example of the principles described herein.

FIG. 6 is a diagram showing an illustrative method (600) for updating web resources. In this example, the method (600) includes downloading (601) an application to a client device, extracting (602) web resources from the application to local files, and querying (603) an external server for web resource updates specific to at least one operating condition of the client device.

In some examples, the operating condition is a version of the native container used to implement the application, a type of operating system used by the client device, a version of the web resources, other operating condition, or combinations thereof. In some examples, the query includes an operating system identification, a native container version identification, a web resource identification, other operating condition identification, or combinations thereof.

The client device may send the query in response to an application start-up, an initial application start-up, a subsequent application start-up, a change in an application's foreground/background status, or combinations thereof. In some examples, the client device sends a notice that the client device is updating the web resources.

The method may also include downloading updates to the web resources to the client device and updating a web resource version identification in a native container for implementing the application. The method may further include extracting the web resource updates to the local files after downloading the updates is complete. The native container may use the contents in the local files to run the application. The local files' contents may be the most recent version of the web resources.

In some examples, the updates include specific updates that are compatible for a single type of operating system and include common updates that are compatible with multiple types of operating systems. The method may include overriding the common updates with the specific updates in response to a conflict between the common and specific updates.

Figure 7:
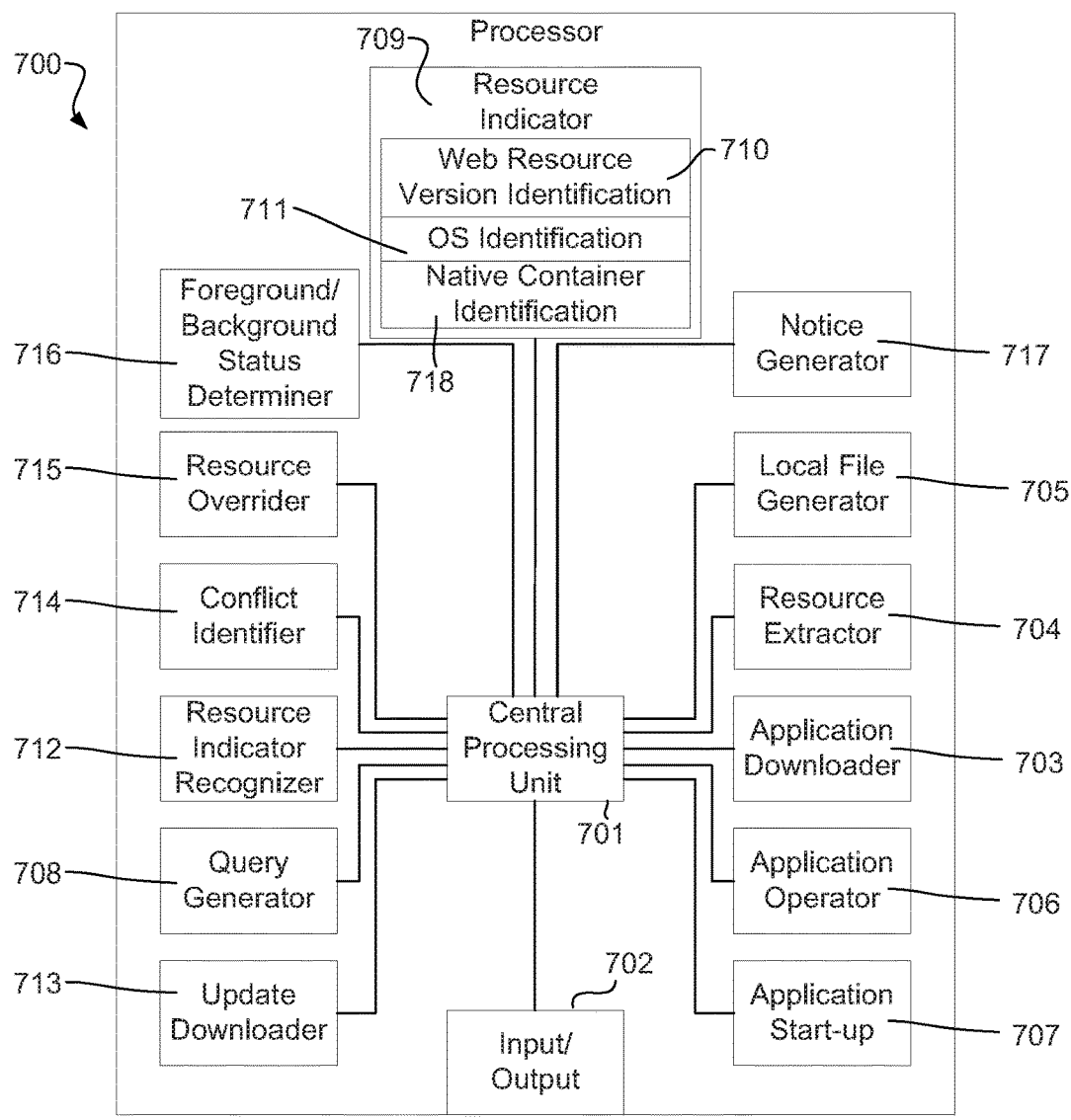
FIG. 7 is a diagram showing an illustrative processor, according to one example of the principles described herein.

FIG. 7 is a diagram showing an illustrative processor (700). In this example, a central processing unit (CPU) (701) is in communication with an input/output (702). The CPU (701) may be in communication with an application downloader (703) that may download an application for a client device from an online source. A resource extractor (704) may extract web resources pre-packaged in the application and put them into local files created by a local file generator (705). In some examples, the local files are located off of the processor chip, but in alternative examples, the local files are located on processor's chip.

The CPU (701) may also be in communication with an application operator (706) that operates the application. An application start-up (707) may start the application for the initial start-up and/or subsequent start-ups. In some examples, the resource extractor (704) extracts the web resources from the application during the initial start-up of the application on the client device. During operation, the application operator (706) may access the local files for web resources that were extracted from the application.

During a start-up or during the application's operation, a query generator (708) may generate a query for updates. A foreground/background status determiner (716) may determine when a change in the application's foreground/background status occurs and cause the CPU (701) to send the query. The CPU (701) may send the query to the input/output (702) that sends the query to an external server to look for updates. The external server may be located at some location accessible over the internet. In some examples, the external server is located over a network, such as a local area network, a wide area network, a telecommunications network, a private virtual network, a corporate network, another type of network, or combinations thereof. In this example, in response to sending the query, a notice generator (717) may generate a notice intended for the client device's user that indicates that the client device is updating the web resources.

The query may include a resource indicator (709), which may include a web resource version identification (710), an operating system identification (711), a native container identification (718), other operating condition identification, or combination thereof. The resource indicator (709) may be used to identify an appropriate update bundle that is specific for the client device. For example, the web resource version identification (710) may include an identification of the current version of web resources being used in the local files. If the external server has a more updated version than the current version in the local files, then the external server may recognize that the client device needs the updated version. Also, the operating system identification (711) may include an identification that allows the external server to recognize the client device's type of operating system and send an update bundle that has updates that are specific to that type of operating system.

In the example of FIG. 7, the processor (700) includes a resource indicator recognizer (712) that may be used to determine if an update bundle sent from the external server is appropriate for the client device. For example, the resource indicator recognizer (712) may check the operating system identifier and/or a version identifier included in an update bundle from the external server. If the version identifier indicates that the update version sent by the external server is newer than what is currently in the local files, an update downloader (713) may download the newer version of updates. The newer update version may replace the current version in the local files in whole or in part. If the version identifier indicates that the version in the update bundle is not newer than what is included in the local files, then the processor (700) may disregard the update. Likewise, if the operating system identifier in the update bundle indicates that the update is intended for an application operated on a device with an operating system other than the client device's operating system, then the processor (700) may also disregard the update bundle.

The updates may include common web resources that may be universally used on devices different operating conditions. Also, the updates may include specific updates that are specific to operating conditions of the client device. The processor (700) may include a conflict identifier (714) that identifies whether there is a conflict between the common and specific updates. If there is a conflict between the common and specific updates, then a resource overrider (715) may cause the specific updates to override the common updates when the application is in use. For example, the conflict identifier (714) may a conflict between the common updates and updates specific for type of operating system or a conflict between the common updates and updates specific for a specific version of a native container.

Figure 8:
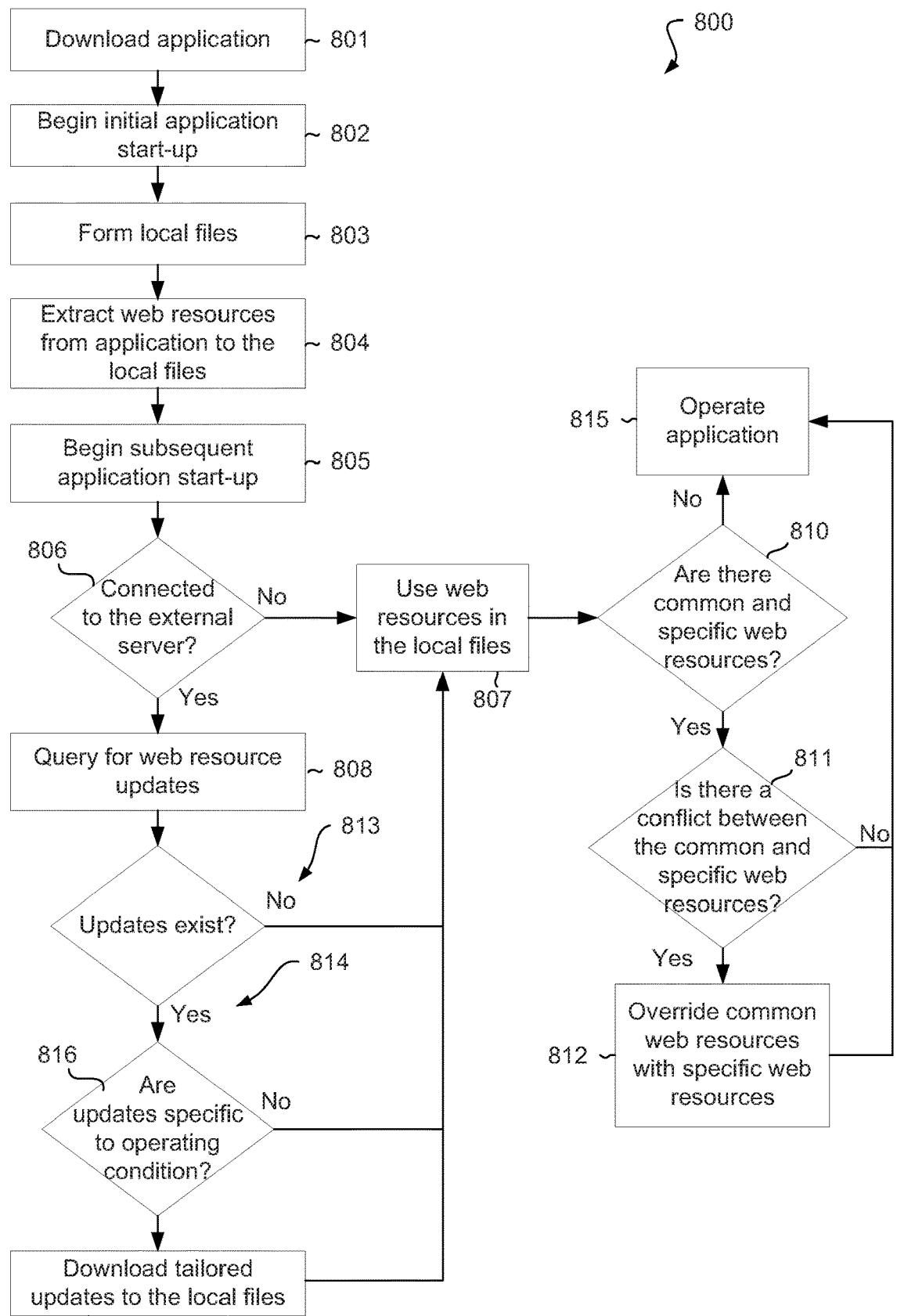
FIG. 8 is a diagram showing an illustrative flowchart of a process for updating web resources, according to one example of the principles described herein.

FIG. 8 is a diagram showing an illustrative flowchart (800) of a process for updating web resources. In this example, the flowchart (800) includes downloading (801) the application from an online source. The process may also include beginning (802) an initial application start-up of the application on the client device. The start-up may include forming (803) local files and extracting (804) web resources from the application to the local files. While the application is running, the application may use the web resources in the local files.

In response to beginning (805) a subsequent application start-up, the process may include determining (806) whether the client device has a connection to the external server. If not, the application may use (807) the web resources in the local files to operate the application. If the client device establishes a connection with the external server, then the process may include querying (808) the external server for web resource updates. If the external server does not have any updates (813), then the process may include using (807) the web resources in the local files to operate the application. If updates exist (814), then the process may include determining (816) whether the updates are specific to the operating conditions of the client device. If available updates are specific to the operating conditions of the client device's operating conditions, then the process may include downloading (809) the updates to the local files.

In some examples, downloading the updates includes replacing the original contents of the local files in whole or in part at the completion of the download. In other examples, the updates replace the local files' contents in whole or in part at a later time, such as at the beginning of a subsequent application start-up or at the termination of the current application's operation. After downloading, the process may include using (807) the web resources in the local files to operate the application.

The process may also include determining (810) whether there are both common and specific web resources in the local files. The common updates may be updates that are compatible with multiple operating systems and/or multiple versions of native containers. The specific updates may be updates that are specific to a type of operating system, a specific version of a native container, another operating condition, or combinations thereof. If so, then determining (811) whether there is a conflict between the common and specific web resources. If there is a conflict, then the process may include overriding (812) the common web resources with the specific web resources. In response to determining that both common and specific web resources do not exist or that there is no conflict between such web resources, the process may include operating (815) the application. In some examples, the process includes operating the application after overriding any conflicts, and in other applications the process includes just overriding conflicts as they become relevant during the operation of the application.

Figure 9:
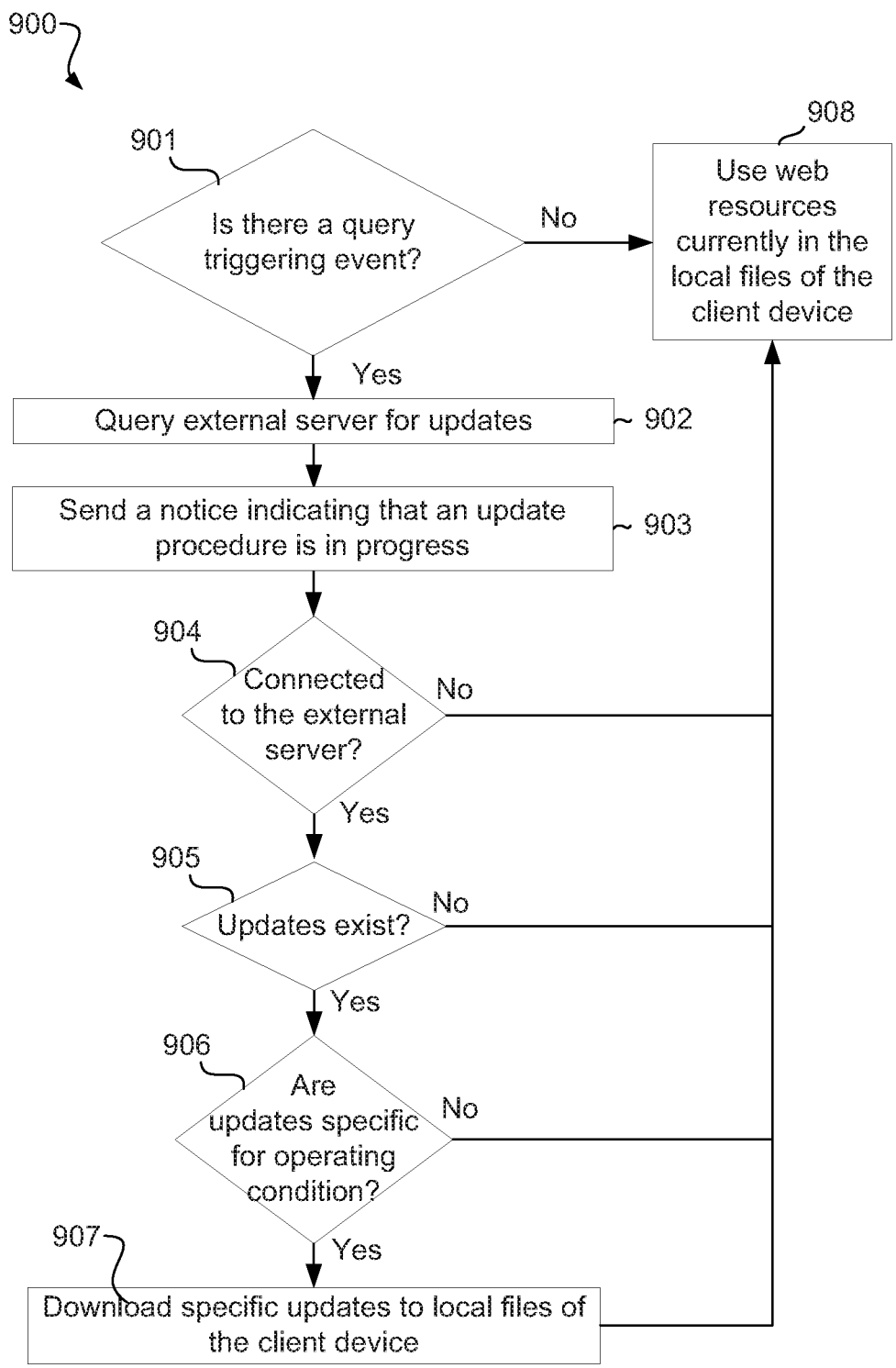
FIG. 9 is a diagram showing an illustrative flowchart of a process for updating web resources, according to one example of the principles described herein.

FIG. 9 is a diagram showing an illustrative flowchart (900) of a process for updating web resources. In this example, the process includes determining (901) whether there is a querying triggering event. In some examples, the querying triggering event is an application start-up, initial application start-up, a subsequent application start-up, a change in an application's foreground/background status, a change in another applications foreground/background status, an application shut-down, another query triggering event, or combinations thereof.

If there is no query triggering event, then the process may include using (908) the web resources currently in local files of the client device. If there is a query triggering event, the process may include querying (902) the external server for updates. In the examples of FIG. 9, the process includes sending (903) a notice indicating that an update procedure is in progress.

The process may also include determining (904) if the client device can make a connection to the external server. If a connection is established, the process may include determining (905) whether updates exist. If updates exist, the process may include determining (906) whether the existing updates are specific for the client device's operating conditions. If all determinations (904, 905, 906) are all affirmative, then the process may include downloading (907) the specific updates to local files of the client device. If any of the determinations (904, 905, 906) is negative, then the process may include using (908) the web resources currently in the local files of the client device.

In some examples, sending (903) notice is in response to the establishment of a connection with an external server, in response to finding existing updates, in response to determining that existing updates are specific to the client device's operating conditions, in response other notice triggering events, or combinations thereof. In some examples, the notice continues to indicate that an updating procedure is occurring until the updates are downloaded and web resource updates are extracted to the local files.

Figure 10:
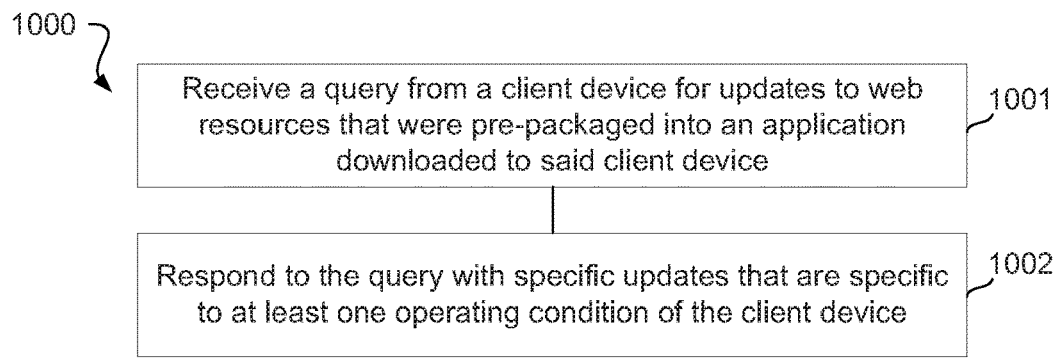
FIG. 10 is a diagram showing an illustrative method for updating web resources, according to one example of the principles described herein.

FIG. 10 is a diagram showing an illustrative method (1000) for updating web resources. In this example, the method (1000) includes receiving (1001) a query from a client device for updates to web resources that were prepackaged into an application downloaded to the client device and responding (1002) to the query with specific updates that are specific to at least one operating condition of the client device. In some examples, the client device's operating conditions are selected from the group consisting of a version of a native container, a type of operating system, a web resource version, and combinations thereof.

Figure 11:
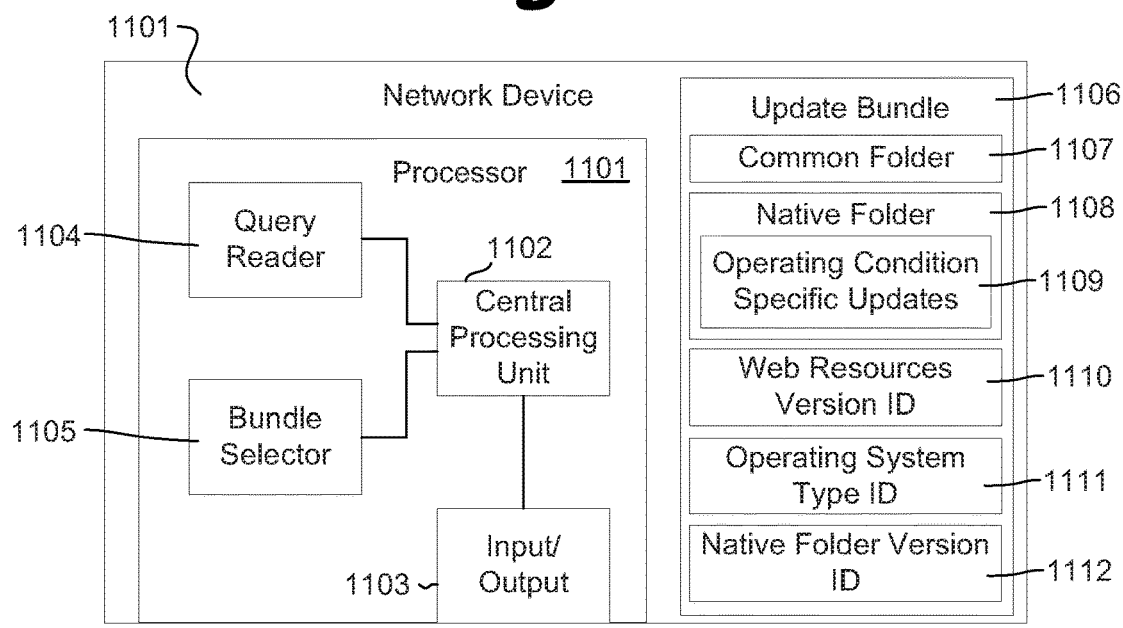
FIG. 11 is a diagram showing an illustrative network device, according to one example of the principles described herein.

FIG. 11 is a diagram showing an illustrative network device (1100), such as an external server. In this example, the network device (1100) has a processor (1101) with a central processing unit (CPU) (1102) that is in communication with an input/output (1103). The processor (1101) may receive a query from a client device looking for updates. The processor (1101) may include a query reader (1104) that identifies whether an update bundle should be sent to the client device. If so, a bundle selector (1105) may identify the appropriate update bundle with the appropriate operating conditions for the client device.

In this example, the network device (1100) contains an update bundle (1106) that has a common folder (1107) that contains updates that are intended for multiple operating conditions. Further, the update bundles (1106) may also include a native folder (1108) that contains operating condition specific updates (1109) that are specific to just certain types of operating conditions. In this example, the update bundle (1106) also includes a web resources version identification (1110), an operating system type identification (1111), and a native container version identification (1112). In some examples, the update bundle (1106) includes other operating condition specific identifications.

In this example, the update bundle (1106) is stored off of the processor (1101), but in some examples, the update bundles are stored on the processor's chip. In response to the bundle selector (1105) selecting update bundle (1106), the processor (1101) may cause the update bundle (1106) to be sent to the client device.

Figure 12:
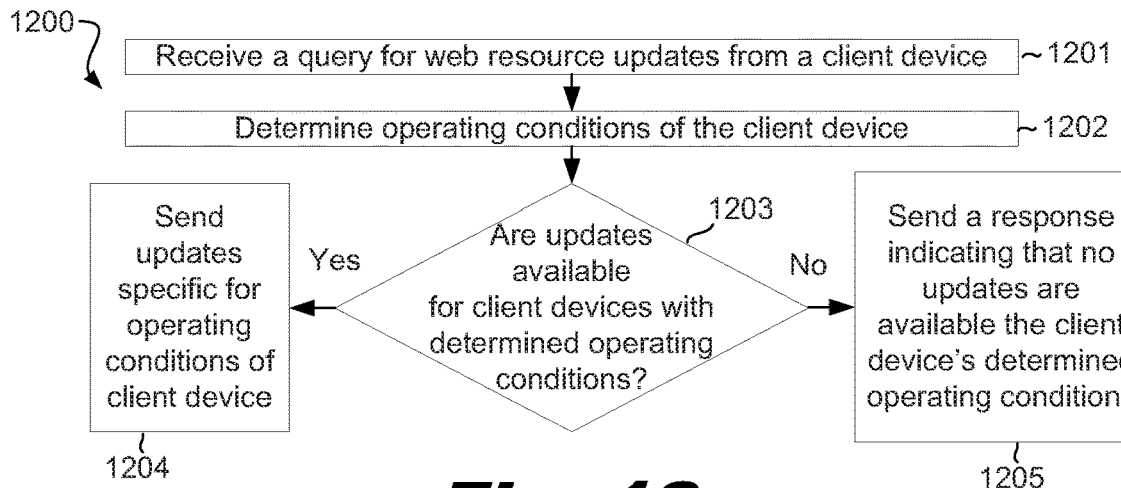
FIG. 12 is a diagram showing an illustrative flowchart of a process for updating web resources, according to one example of the principles described herein.

FIG. 12 is a diagram showing an illustrative flowchart (1200) of a process for updating web resources. In this example, the process includes receiving (1201) a query for web resource updates from a client device and determining (1202) operating conditions of the client device. The process may also include determining (1203) if there are updates available for the client device with the determined operating conditions. The process may determine that the client device's operating conditions by reading indicators included in the query. If there are updates available that are compatible with the client device's determined operating conditions, then the process may include sending (1204) the updates that are specific for the operating conditions of the client device. If there are not updates available that are compatible with the client device's determined operating conditions, then the process may include sending (1205) a response indicating that there are no updates available that are specific for the operating conditions of the client device.

Figure 13:
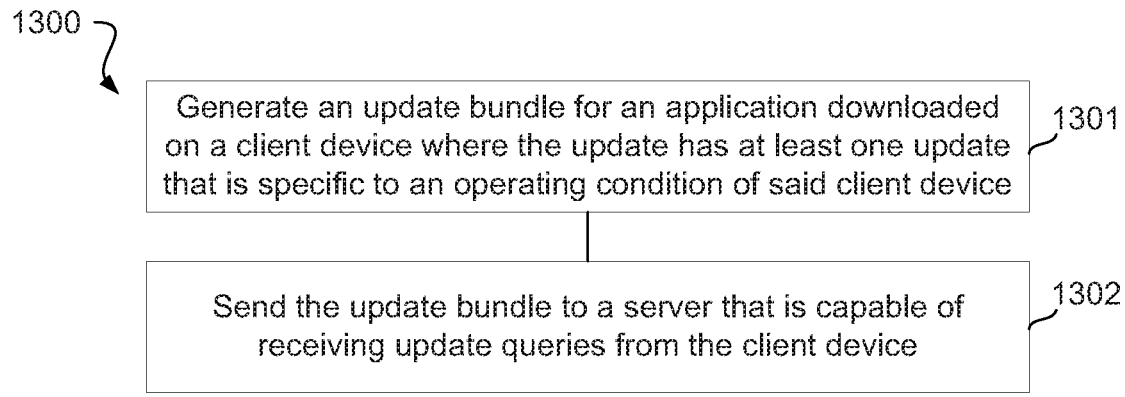
FIG. 13 is a diagram showing an illustrative method for updating web resources, according to one example of the principles described herein.

FIG. 13 is a diagram showing an illustrative method (1300) for updating web resources, according to one example of the principles described herein. In this example, the method (1300) includes generating (1301) an update bundle for an application downloaded on a client device where the update bundle comprises at least on update that is specific to an operating condition of the client device and sending (1302) the update bundle to a server that is capable of receiving update queries from the client device.

In some examples, the operating condition is a native container version of the client device, a type of operating system of the client device, another operating condition of the client device, or combinations thereof. In some examples, the update bundle may include at least one common update that is compatible with multiple operating conditions of client devices.

The update bundle may also include identifications that match the operating conditions of the client device for which the update bundle is intended. For example, the update bundle may have a native container identification that matches a version of the native container of the client device, an operating system identification that matches a type of operating system of the client device, another identification that matches another operating condition of the client device, or combinations thereof.

Figure 14:
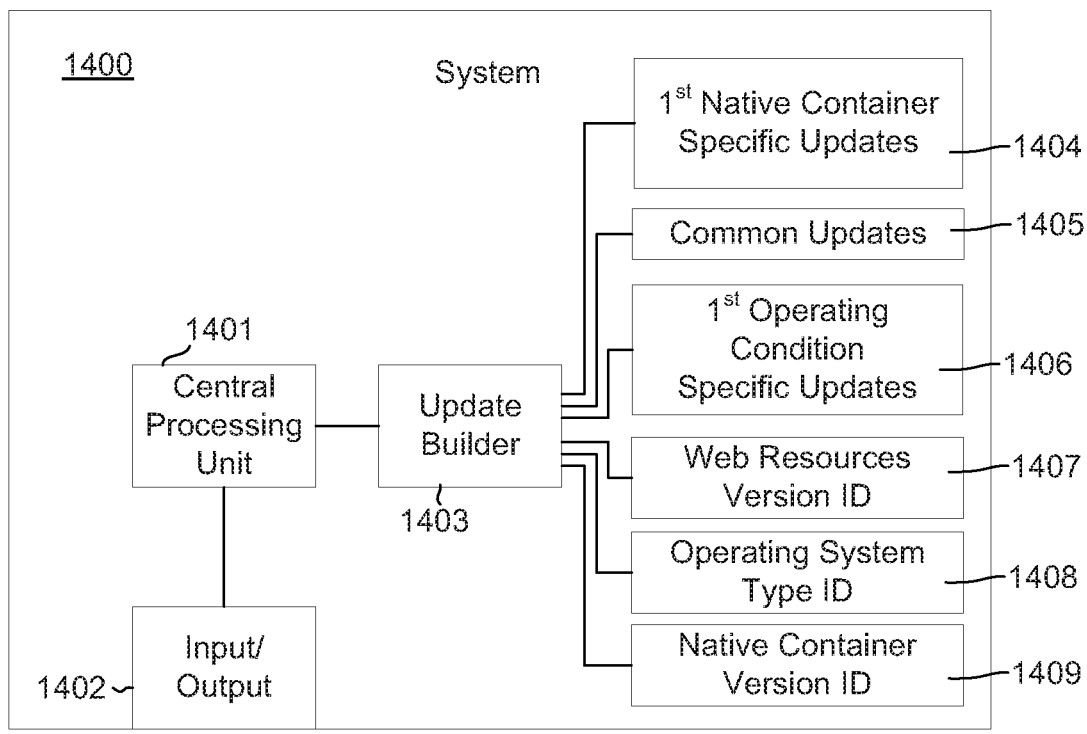
FIG. 14 is a diagram showing an illustrative system for updating web resources, according to one example of the principles described herein.

FIG. 14 is a diagram showing an illustrative system (1400) for updating web resources, according to one example of the principles described herein. In this example, the system (1400) may be a development environment for building updates. The system (1400) may include a central processing unit (CPU) (1401) in communication with an input/output (1402). The input/output (1402) may be in communication with an external server that is capable of receiving queries from the client device for updates to the application.

The system (1400) may also include an update builder (1403) that may assemble update components for specific client devices into an update bundle. For examples, the updated builder (1403) may be in communication with update (1404) for a first native container. In some examples, the update builder (1403) is in communication with update for other native containers of client devices.

The update builder (1403) may also be in communication with common updates (1405) that are compatible with multiple operating conditions of client devices. The update builder (1403) may also be in communication with updates (1406) for a first operating system. In some examples, the update builder (1403) is also in communication with updates for other operating systems.

The update builder (1403) may also be in communication with identifications to match the update bundle. The identifications may include a web resources version identification (1407), an operating system type identification (1408), a native container version identification (1409), another identification, or combinations thereof.

After an update bundle is complete the update bundle may be sent to an external server. The client device may query the server for the update. If the identifications in the query match the identification in the update bundle, the server may send the update bundle to the client device.

The system (1400) may provide a streamlined process for providing updates to applications. For example, an application store may have a process for approving updated version of an application. However, by sending the application updates to the external server, the client device may receive the updates quicker. The update bundles may still be sent to the application store to update the application available for downloading, but the current user may receive the updated before that process is complete.

While the above examples have been described with specific servers and specific client devices, any servers or client devices may be used according to the principles described herein. Further, while the above examples have been described with specific indicators for matching queries with appropriate updates, any indicators may be used according to the principles described herein. Further, while specific query and response structures have been described with the above mentioned examples, any structures for queries or responses may be used in accordance with the principles described herein. Further, while specific update bundles have been described with both specific and common updates, the scope of the principles described herein includes bundles with just common or just specific updates.

Further, while some of the above examples have been described with specific subsequent application start-ups, a subsequent application start-up may be any start-up of the application that occurs after the initial application start-up. While some of the examples have been described with specific types of web resources, any web resources may be included within the scope of the principles described herein. Also, while the examples above have been described with specific types of operating conditions, any operating conditions that may affect the client device's ability to implement an update may be used in accordance with the principles described herein.

The descriptions of the various examples of the present invention have been presented for purposes of illustration, but are not intended to be exhaustive or limited to the examples disclosed. Many modifications and variations will be apparent to those of ordinary skill in the art without departing from the scope and spirit of the described examples. The terminology used herein was chosen to best explain the principles of the examples, the practical application or technical improvement over technologies found in the marketplace, or to enable others of ordinary skill in the art to understand the examples disclosed herein.

What is claimed is:

1. A method for updating web resources, comprising:
   extracting web resources from a downloaded application to local files of a client device; and
   querying an external server for web resource updates specific to at least one operating condition of the client device, the query comprising a native container version identification that identifies an update bundle that includes a native container identification that corresponds to the native container version identification, wherein the web resource updates comprise specific updates that are compatible with a type of operating system, and common updates that are compatible with multiple types of operating systems, and wherein the common updates are overridden with the specific updates in response to a conflict between the common and specific updates.

2. The method of claim 1, wherein the at least one operating condition is selected from the group consisting of a version of a native container for implementing the application, a type of operating system of the client device, a version of the web resources, and combinations thereof.

3. The method of claim 1, wherein querying an external server for web resource updates specific to the at least one operating condition of the client device includes sending a query that includes information selected from the group consisting of an operating system identification, a web resource identification, and combinations thereof.

4. The method of claim 1, further comprising downloading the web resource updates to the client device, wherein downloading the web resource updates to the client device includes updating a web resource version identification stored in a native container of the client device.

5. The method of claim 1, wherein querying an external server for web resource updates specific to the at least one operating condition of the client device includes querying the external server in response to a change an application's foreground/background status.

6. The method of claim 1, wherein querying an external server for web resource updates specific to the at least one operating condition of the client device includes sending a notice that the client device is updating the web resources.

7. A client device, comprising:
at least one processor to execute computer readable instructions to:
extract a web resource from an application downloaded to a native container of a client device;
query a server for web resource updates with a query that comprises a native container version identification that identifies an update bundle that includes a native container identification that corresponds to the native container version identification, wherein the web resource updates comprise specific updates that are compatible with a type of operating system, and common updates that are compatible with multiple types of operating systems, and wherein the common updates are overridden with the specific updates in response to a conflict between the common and specific updates.

8. The client device of claim 7, wherein the processor:
downloads the web resource updates into the native container; and
extracts the web resource updates in response to completion of the downloading of the web resource updates.

9. The client device of claim 7, wherein the processor operates the application with contents in the local files.

10. The client device of claim 7, wherein the processor updates the native container identification in response to downloading the web resource updates from the server.

11. The client device of claim 7, wherein the processor queries the server for the web resource updates in response to a change in the application's change in foreground/background status.

12. The client device of claim 7, wherein the processor includes a resource indicator recognizer to determine if an update bundle sent from the external server is appropriate for the client device.

13. A server, comprising:
at least one processor to execute computer readable instructions to:
generate an update bundle for web resources downloaded in an application package by a client device, the update bundle comprising at least one update that is specific to an operating condition of the client device, wherein the update bundle comprises specific updates that are compatible with a type of operating system, and common updates that are compatible with multiple types of operating systems, and wherein the common updates are overridden with the specific updates in response to a conflict between the common and specific updates; and
in response to a request from the client device, send the update bundle to the client device,
wherein the update bundle is pre-packaged in the application package.

14. The server of claim 13, wherein the operating condition is a version of a native container for implementing the application.

15. The server of claim 13, wherein the operating condition is a type of operating system of the client device.

16. The server of claim 13, wherein the operating condition is a version of the web resources.

17. The server of claim 13, wherein the server stores a plurality of different update bundles, the update bundles comprising updates selected from the group consisting of different operating system specific updates, different native container version updates, different web resource version updates, other operating condition versions, and combinations thereof.

18. The server of claim 13, wherein the processor receives the update bundles from a development environment coupled to the server.

19. The server of claim 13, wherein the processor comprises a query reader to identify an appropriate update bundle with appropriate operating conditions for the client device.

* * * * *

UNITED STATES PATENT AND TRADEMARK OFFICE
CERTIFICATE OF CORRECTION

PATENT NO. : 10,713,034 B2
APPLICATION NO. : 16/128308
DATED : July 14, 2020
INVENTOR(S) : Anton Aleksandrov et al.

It is certified that error appears in the above-identified patent and that said Letters Patent is hereby corrected as shown below:

On the Title Page

Column 2, item (56), U.S. patent documents, cite no. 1, delete "Chiles" and insert --Chiles et al.--, therefor.
In page 2, Column 2, item (56), U.S. patent documents, cite no. 22, delete "Horiuchi" and insert --Horiuchi et al.--, therefor.

In the Specification

In Column 8, Line(s) 37, before "hour", delete "a" and insert --an--, therefor.

Signed and Sealed this
Eighth Day of December, 2020

Andrei Iancu
*Director of the United States Patent and Trademark Office*